United States Patent
Blunk et al.

(10) Patent No.: US 9,065,087 B2
(45) Date of Patent: Jun. 23, 2015

(54) STABLE ULTRALYOPHOBIC COATING FOR PEMFC BIPOLAR PLATE WATER MANAGEMENT

(75) Inventors: Richard H. Blunk, Macomb Township, MI (US); Robert R. Quiel, Penfield, NY (US); Andrew P. Nowak, Los Angeles, CA (US); Daniel W. Gorkiewicz, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 703 days.

(21) Appl. No.: 13/103,444

(22) Filed: May 9, 2011

(65) Prior Publication Data

US 2012/0288782 A1 Nov. 15, 2012

(51) Int. Cl.
*H01M 8/10* (2006.01)
*H01M 8/02* (2006.01)
*H01M 8/04* (2006.01)

(52) U.S. Cl.
CPC ............ *H01M 8/0228* (2013.01); *H01M 8/021* (2013.01); *H01M 8/0213* (2013.01); *H01M 8/0221* (2013.01); *H01M 8/04156* (2013.01); *Y02E 60/50* (2013.01)

(58) Field of Classification Search
CPC . H01M 8/021; H01M 8/0213; H01M 8/0228; H01M 8/04156; H01M 8/0221; Y02E 60/50
USPC .......................................... 429/465, 512, 535
See application file for complete search history.

(56) References Cited

U.S. PATENT DOCUMENTS

| | | | |
|---|---|---|---|
| 6,974,648 B2 | 12/2005 | Goebel | |
| 2007/0298309 A1* | 12/2007 | Vyas et al. | 429/38 |
| 2009/0081487 A1* | 3/2009 | Chochos et al. | 429/12 |
| 2010/0062289 A1* | 3/2010 | Christie et al. | 429/13 |

OTHER PUBLICATIONS

Yin, et al., Stability of Superhydrophobicity of Lotus Leaf Under Extreme Humidity, Chem. Letter, 2010, 39, pp. 816-817, www.csf.jp/journals/chem-lett/, The Chemical Society of Japan.
Chen, et al., Ultrahydrophobic and Ultralyophobic Surfaces: Some Comments and Examples, ACS Publications, American Chemical Society, 1999, pp. 3394-3399.
Chaudhury, et al., How to Make Water Run Uphill, Science, vol. 256, Jun. 12, 1992, pp. 1539-1541.

* cited by examiner

*Primary Examiner* — Gary Harris
(74) *Attorney, Agent, or Firm* — Dinsmore & Shohl LLP

(57) ABSTRACT

An electrode plate is disclosed. The electrode plate includes a plate having an active area, a feed region in fluid communication with the active region, and a tunnel region in fluid communication with the feed region and a manifold region, an ultralyophobic coating on one or more of at least a portion of the tunnel region, at least a portion of the feed region, and an interface between the tunnel region and the manifold region. Fuel cells using the electrode plate and methods of making electrode plates are also described.

10 Claims, 4 Drawing Sheets

STABLE ULTRALYOPHOBIC COATING FOR PEMFC BIPOLAR PLATE WATER MANAGEMENT

FIELD OF THE INVENTION

The present invention is generally directed to electrochemical conversion cells e.g. fuel cells, and is specifically directed to controlling the water accumulation in the outlet areas of anodes and/or cathodes in fuel cells.

BACKGROUND OF THE INVENTION

The present invention relates to electrochemical conversion cells, commonly referred to as fuel cells, which produce electrical energy by processing first and second reactants. For example, electrical energy can be generated in a fuel cell through the reduction of an oxygen-containing gas and the oxidation of a hydrogenous gas. By way of illustration and not limitation, a typical cell comprises a membrane electrode assembly (MEA) positioned between a pair of flowfields accommodating respective ones of the reactants. More specifically, a cathode flowfield plate and an anode flowfield plate can be positioned on opposite sides of the MEA. The voltage provided by a single cell unit is typically too small for useful application so it is common to arrange a plurality of cells in a conductively coupled "stack" to increase the electrical output of the electrochemical conversion assembly.

The MEA typically comprises a proton exchange membrane separating an anode layer and a cathode layer of the MEA. The MEA is typically characterized by enhanced proton conductivity under wet conditions. For the purpose of describing the context of the present invention, it is noted that the general configuration and operation of fuel cells and fuel cell stacks is beyond the scope of the present invention. Regarding the general configuration and operation of fuel cells and fuel cell stacks, applicants refer to the vast collection of teachings covering the manner in which fuel cell "stacks" and the various components of the stack are configured. For example, a plurality of U.S. patents and published applications relate directly to fuel cell configurations and corresponding methods of operation. More specifically, FIGS. 1 and 2 of U.S. Pat. No. 6,974,648 and the accompanying text present a detailed illustration of the components of one type of fuel cell stack and this particular subject matter is expressly incorporated herein by reference.

FIG. 1 illustrates the regions of the anode side bipolar plate 5 (the cathode side would have similar regions). The anode side of the bipolar plate includes an active area 10, feed regions 15, tunnel regions 20, and manifolds 25. Liquid water accumulates in the anode (and cathode) outlet areas of bipolar plates during fuel cell operation. The water needs to be purged prior to stack shutdown to prevent the water from freezing and blocking the anode flow (anode starvation) upon subsequent stack startup at sub-freezing temperatures.

SUMMARY OF THE INVENTION

One aspect of the invention is an electrode plate. In one embodiment, the electrode plate includes a plate having an active area, a feed region in fluid communication with the active region, and a tunnel/port region in fluid communication with the feed region and the manifold region, an ultralyophobic coating on one or more of at least a portion of the tunnel region, at least a portion of the feed region, and an interface between the tunnel region and the manifold region.

Another aspect of the invention is a fuel cell assembly. In one embodiment, the fuel cell assembly includes a plurality of membrane electrode assemblies, each comprising an anode configured to accept a hydrogen-bearing reactant, and a cathode configured to accept an oxygen-bearing reactant, the anode and cathode separated by a proton-permeable electrolyte membrane; and a plurality of electrode plates each of which is disposed between a pair of the plurality of membrane electrode assemblies, each plate defining a reactant channel in fluid communication with a corresponding one of the anode or the cathode of an adjacently facing one of the membrane electrode assemblies, each plate having an active area, a feed region in fluid communication with the active region, and a tunnel/port region in fluid communication with the feed region and a manifold region on at least one side, at least one side of each plate having an ultralyophobic coating on one or more of at least a portion of the tunnel region, at least a portion of the feed region, and an interface between the tunnel region and the manifold region.

Another aspect of the invention is a method of making a fuel cell having reduced water accumulation in an electrode outlet area. In one embodiment, the method includes providing a plurality of plates, each plate having an active area, a feed region in fluid communication with the active region, and a tunnel/port region in fluid communication with the feed region and a manifold region on at least one side of the plate; depositing an ultralyophobic coating on one or more of at least a portion of the tunnel region, at least a portion of the feed region, and an interface between the tunnel region and the manifold region on at least one side of the plate; providing a plurality of membrane electrode assemblies, each comprising an anode configured to accept a hydrogen-bearing reactant, and a cathode configured to accept an oxygen-bearing reactant, the anode and cathode separated by a proton-permeable electrolyte membrane; and placing each one the plurality of plates between a pair of the plurality of membrane electrode assemblies, the side of the plate having the ultralyophobic coating being in fluid communication with the anode or the cathode.

BRIEF DESCRIPTION OF THE INVENTION

Figure 3A:
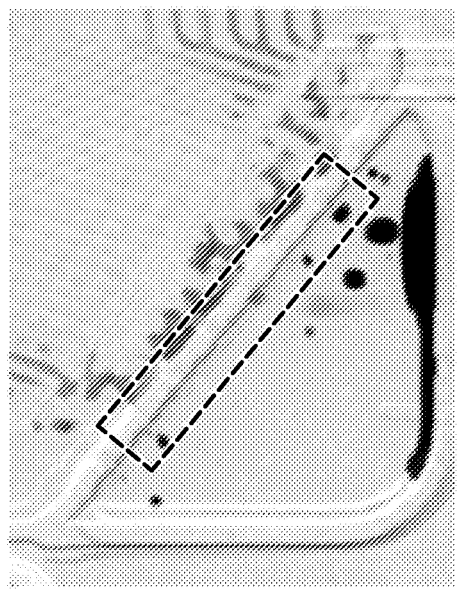
Figure 3B:
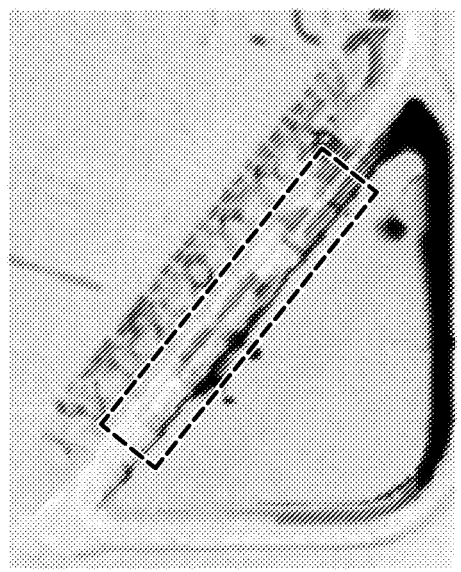

FIGS. 3A-B are neutron radiography images of liquid water holdup in the anode outlet tunnel regions (tunnel/manifold interface) of a fuel cell for uncoated and coated feed/tunnel regions.

Figure 4:
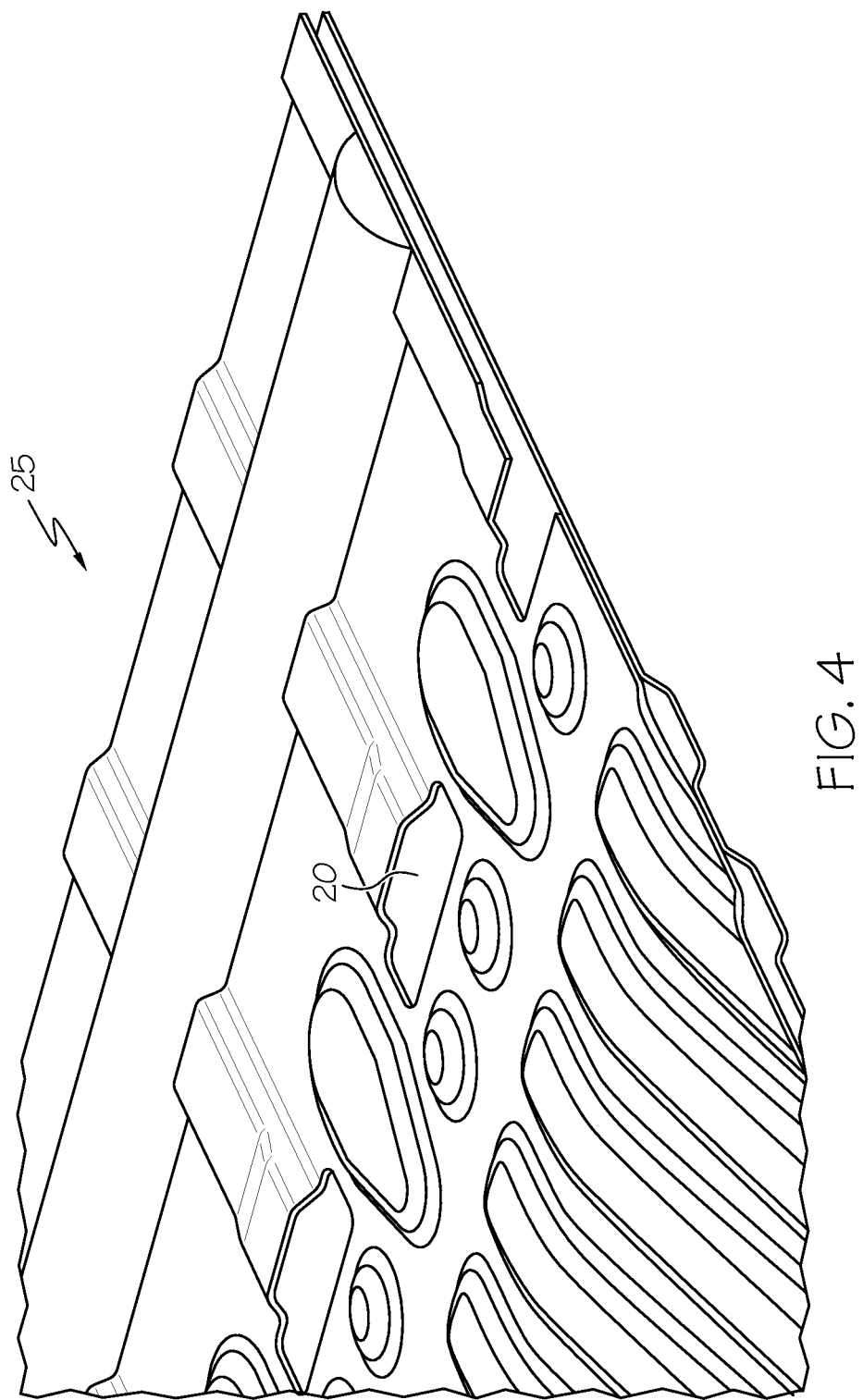

FIG. 4 is an illustration of a tunnel region of a bipolar plate extending from the feed region to the manifold region.

DETAILED DESCRIPTION OF THE INVENTION

Ultralyophobic coatings exhibit moderately high static water contact angles WCA (90°<WCA<120°) and low contact angle hysteresis CAH (CAH<20°, CAH=advancing contact angle minus receding contact angle). These liquid-like, flexible, smooth, water-repelling coatings enhance the mobility of liquid water droplets, causing water droplets to easily slide down slightly tilted surfaces via small gravitational forces. A 'passive' frictional force, which is proportional to the CAH and defined by $$F = \sigma_{lg}\omega(\cos\Theta_r - \cos\Theta_a), \quad (1)$$

(where F is the force (e.g., gravity, shear, capillary, etc.), $\sigma_{lg}$ is the liquid-vapor interfacial tension, and ω is the droplet width) must be overcome to enable liquid droplet mobility [C. G. L. Furmidge, J. Colloid Sci., 17, 309, (1962)]. CAH, which is not predicted by the well-known Wenzel and Cassie equations, has been found to be an important parameter for characterizing droplet mobility, not the magnitude of the static water contact angles [M. K. Chaudhury and G. M. Whitesides, "How to Make Water Run Uphill", Science, vol. 256, 12 Jun. (1992)]. Ultralyophobic coatings are recommended over superhydrophobic coatings in water-removal applications, particularly in hot water-condensing environments [W. Chen, A. Y. Fadeev, M. C. Hsieh, D. Oner, J. Youngblood, and T. J. McCarthy, "Ultrahydrophobic and Ultralyophobic Surfaces: Some Comments and Examples", Langmuir 15, 3395-3399, (1999)]. Although superhydrophobic coatings/surfaces, which are based on low intrinsic surface energy combined with nano- and micron-structured surface topography, exhibit extremely high static water contact angles (120°<WCA<180°) and extremely low CAH (CAH<5°), hot water droplets and condensed water droplets are pinned within the structured surface, causing water droplets to stick. For example, condensed water droplets are known to stick on a Lotus Leaf [L. Yin, Q. Wang, J. Xue, J. Ding, and Q. Chen, "Stability of Superhydrophobicity of Lotus Leaf under Extreme Humidity", Chem. Lett., 39, 816817, (2010)].

Liquid water must be managed (removed) in a Proton Exchange Membrane (PEM) fuel cell to enable reactant gases to flow without obstruction to the electrodes for electrochemical power conversion. This is true during vehicle operation (60° C. to 95° C.) and especially during fuel cell startup from sub-freezing temperatures (−40° C. to 0° C.). An ultralyophobic coating, not a superhydrophobic one, is recommended in the feed/tunnel/port regions of the bipolar plate to remove liquid water in the hot, water-condensing PEM fuel cell environment. A static water contact angle exceeding 90° prevents liquid water at the tunnel/manifold interface from wicking back into the tunnels via capillarity forces, adversely impacting quick freeze start-ups (QFS). A low CAH (<20°) facilitates purging and removal of liquid water droplets at low shearing gas pressures. More precisely, treating the anode outlet of bipolar plates with an ultralyophobic coating reduces purge time, purge energy, and $H_2$ fuel, for subsequent quick freeze-startups of stacks.

The ultralyophobic coating covers one or more of at least a portion of the tunnel region, at least a portion of the feed region, and an interface between the tunnel region and the manifold region. The ultralyophobic coating desirably coats the feed region (all or partially), the tunnel/port region, and the interface between the tunnel exit and the manifold (the side wall of the exiting tunnel). Water dripping down the side wall of the tunnel/manifold can easily wick back into the tunnels if the static water contact angle is less than 90 degrees.

The ultralyophobic coating can be amorphous or partially crystalline fluoropolymers, (e.g., a copolymer of perfluoro(2, 2-dimethyl-1,3-dioxole) (PDD) and tetrafluoroethylene (TFE), such as Dupont Teflon® AF 1600, and 2400). Amorphous and partially crystalline fluoropolymers are chemically and thermally stable, i.e., remain ultralyophobic in the hot, aqueous fuel cell environment. The use of amorphous fluoropolymers is advantageous because they will dissolve at room temperature in a variety of fluorocarbon-based solvents. As a result, the coating can be easily applied by spraying or dipping at room temperature.

The ultralyophobic coating can be applied onto Au- or carbon-coated stainless steel plates or directly onto uncoated stainless steel by spraying, dipping, or vapor deposition. Vapor deposition is a desirable application method for reduced coating thickness and, in turn, enhanced wet adhesion.

Example 1

Figure 1:
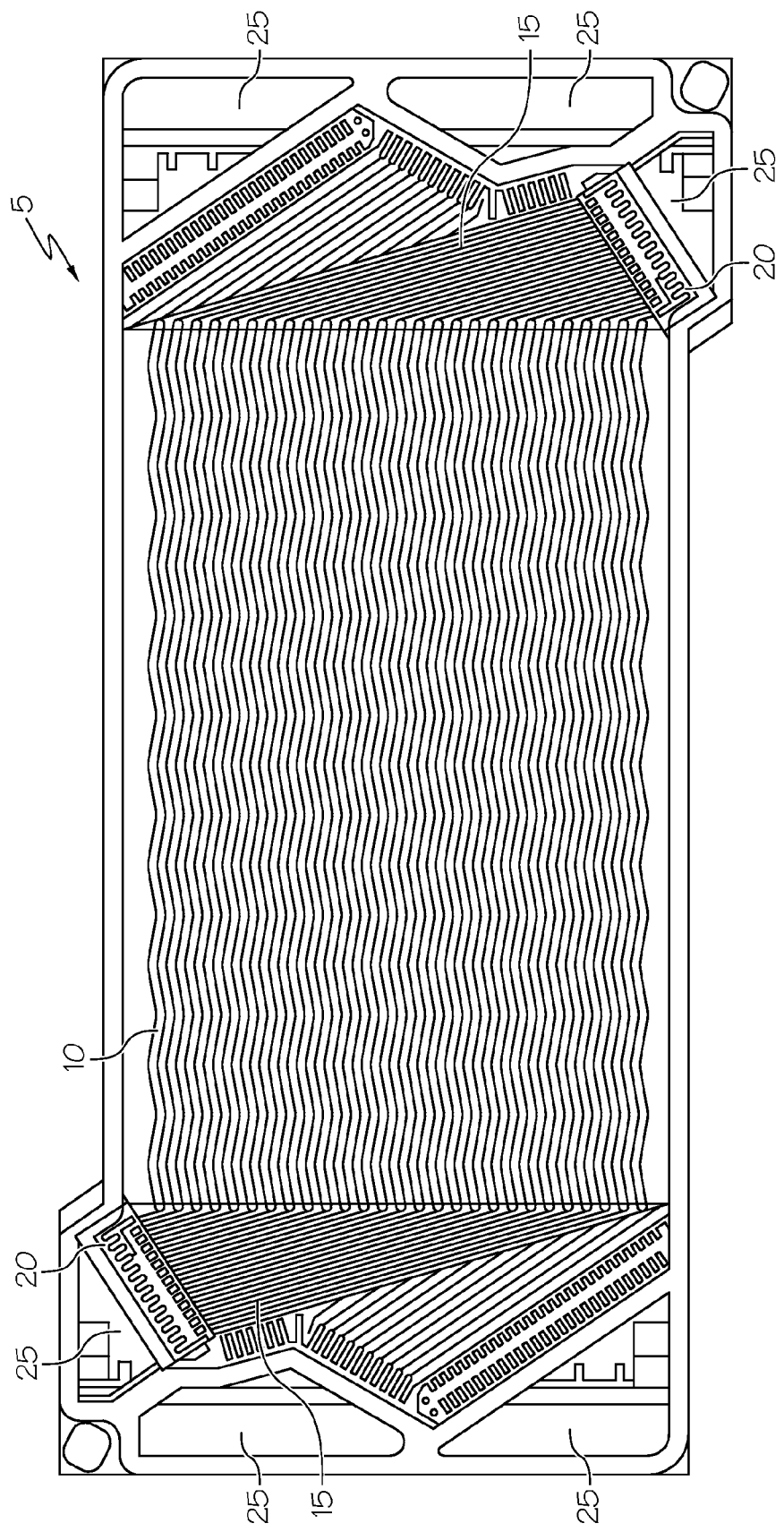
FIG. 1 is an illustration of the anode side of a bipolar plate.
Figure 2:
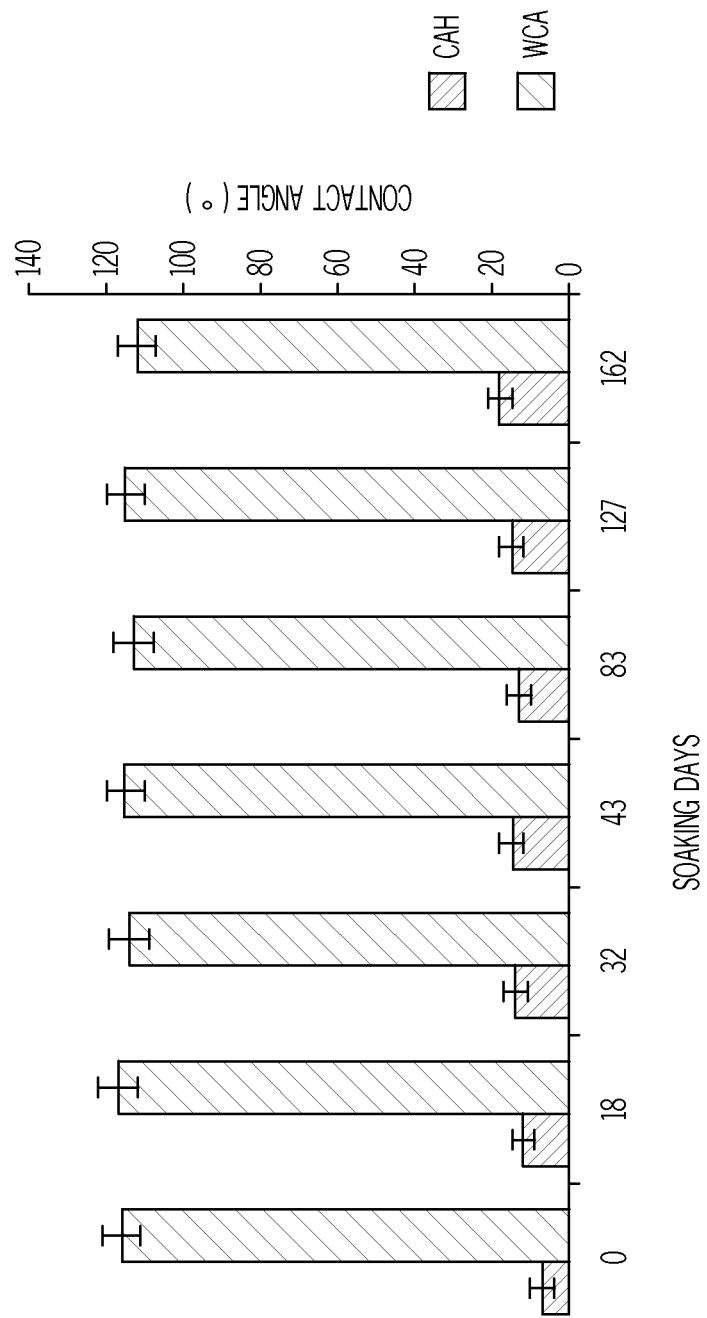
FIG. 2 is a graph showing the water contact angle (WCA) and contact angle hysteresis (CAH) of an ultralyophobic coating on an Au-plated stainless steel coupon as a function of 80° C. water soak time.

Au-plated SS coupons were coated with PTFE/PDD copolymer (AF1600). A thin (1% PTFE/PDD, ca. 160 nm) and high-temperature-baked (330° C. for 20 minutes) top coat was used for adhesion enhancement. The coupons were soaked in PP containers filled with 80° C. de-ionized water. At pre-determined soak times, the samples were removed from the water baths, scrubbed gently with a toothbrush in a 0.1% surfactant solution (TX-100 available from VWR Scientific), and rinsed in a convective stream of de-ionized water to remove any potential surface contamination. The CAH and static WCA data (average of 5 coupons) are shown in FIG. 2. After 162 days of soaking, all of the coupons passed the ultralyophobicity criteria (CAH<20°, WCA>90°) (the test is ongoing).

A bulk AF1600 sample was prepared by compression molding amorphous PTFE/PDD copolymer powder into a 1 in×1 in×2 mm size. The bulk sample did not exhibit any adhesion problems because there is no substrate. The bulk sample also exhibited ultralyophobic behavior after 162 days of hot water soaking, confirming that the PTFE/PDD copolymer exhibits good thermal and chemical resistance.

Example 2

Additional Au-plated SS coupons were dip coated with the PTFE/PDD copolymer, immersed in de-ionized water, and subjected to aggressive thermal cycling stresses to study wet adhesion. Coated samples (6% w/o) were prepared using the following cleaning and drying methods to elucidate adhesion effects:

Cleaning method A—soaked at room temperature (RT) in an alkaline cleaning solution (Simple Green® with a 5-fold dilution) for 10 minutes, followed by two de-ionized water rinses Cleaning method B—sonicated at RT in acetone and then in methanol for 5 minutes each, followed by a 5 sec exposure to open air plasma (PlasmaTreat Inc.) at RT.

Drying method C—90° C. for 12 hrs

Drying method D—170° C. for 1 hr

Static and dynamic WCAs, tilt angles (TAs), and CAH values, before and after exposure to 50 thermal cycles (90° C. to −40° C. to 90° C.), are presented in Tables 4A and 4B, respectively. Initially, before thermal cycling, all of the samples were uniformly ultralyophobic with CAH less than 10°. No cleaning or drying effect was observed. After thermal cycling, however, some free standing films of PTFE/PDD were observed floating on the water surface within the thermal-cycling container, indicating poor wet adhesion. Visual inspection of the samples revealed complete and partial coating delamination (debonding) from the Au surface. These samples exhibited CAH significantly greater than the 20° target, ranging from 50 to 75°.

Based on these data, cleaning/drying method A/D was superior with respect to wet adhesion and, in turn, lyophobic retention. Samples (FT4-FT6), which were cleaned/dried using method A/D, remained lyophobic after thermal cycling with CAH less than 20°. The higher drying temperature of 170° C. is greater than both the solvent boiling point (155° C.) and the copolymer Tg (160° C.), and enables a solvent-free film. By drying at 170° C., 10° C. above the Tg of the copolymer, sufficient free volume exists between polymer molecules/segments to enable efficient diffusion of the solvent molecules to the film surface for evaporation.

The cleaning effect results were unexpected. Before testing, cleaning method B, involving sonication in acetone and methanol, was considered to be superior to cleaning method A, quiescent soaking in alkaline solution. However, the test results did not support this expectation.

The copolymer exhibits good oxidation resistance. In areas of the film that did not delaminate from the Au surface, the TAs remained low at less than 20°. Note that the coating thickness for these samples was approximately 1 μm. A coating thickness of less than about 1 μm, or less than about 900 nm, or less than about 800 nm, or less than about 700 nm, or less than about 600 nm, or less than about 500 nm, or less than about 400 nm, or less than about 300 nm, or less than about 200 nm is recommended for enhanced adhesion to offset any debonding residual stresses created during film drying.

tion, drip dried in a vertical position at ambient temperatures for 2 hrs, and then dried in a convection oven at 170° C. for 2 hrs, followed by 150° C. for 12 hrs. This drying procedure ensures good wet adhesion without increasing the contact resistance (CR) of the plate material or causing the cured-in-place gasket material to outgas. The PTFE/PDD copolymer coating extended from the edge of the manifold/tunnel exit to approximately 2 cm into the feed.

The performance was evaluated using neutron radiography to visualize liquid water transport in a running large-active-area fuel cell. Water holdup images were taken during the test condition of 110% RH outlet. This condition simulates the freeze purge preconditioning protocol used in QFS studies. An Au-plated SS plate was used containing straight-through anode-side tunnels (FIG. 4). Results from this neutron radiography study are shown in FIG. 3D and are compared against those measured previously (FIGS. 3A-B) using the

TABLE 4A

Initial lyophobicity assessment of Au-plated SS coupons coated with PTFE/PDD.

| Sample # | Clean/Dry Method** | WCA (°) | TA (°) | Homogeneity | Adv. WCA (°) | Rec. WCA (°) | CAH (°) |
|---|---|---|---|---|---|---|---|
| FT 1 | A/C | 122°, 117° | 20° | Excellent | 112.74 | 103.11 | 9.63 |
| FT 2 | A/C | 119°, 117° | 20° | Excellent | 110.56 | 102.34 | 8.22 |
| FT 3 | A/C | 118°, 117° | 20° | Excellent | 113.45 | 103.65 | 9.80 |
| FT 4 | A/D | 116°, 114° | 20° | Excellent | 111.56 | 102.99 | 8.57 |
| FT 5 | A/D | 117°, 118° | 20° | Excellent | 110.78 | 101.7 | 9.08 |
| FT 6 | A/D | 118°, 116° | 20° | Excellent | 113.02 | 104.12 | 8.90 |
| FT 7 | B/C | 120°, 117° | 20° | Excellent | 111.24 | 102.17 | 9.07 |
| FT 8 | B/C | 117°, 116° | 20° | Excellent | 112.67 | 102.76 | 9.91 |
| FT 9 | B/C | 119°, 118° | 20° | Excellent | 113.68 | 104.56 | 9.12 |
| FT 10 | B/D | 119°, 118° | 20° | Excellent | 112.9 | 104.32 | 8.58 |
| FT 11 | B/D | 118°, 116° | 20° | Excellent | 111.39 | 101.97 | 9.42 |
| FT 12 | B/D | 116°, 117° | 20° | Excellent | 111.23 | 104.57 | 6.66 |

Effect of cleaning and drying on wet adhesion.

TABLE 4B

Lyophobicity assessment of Au-plated SS coupons coated with PTFE/PDD after 50 thermal cycles.

| Sample # | Clean/Dry Method** | WCA (°) | TA (°) | Homogeneity | Adv. WCA (°) | Rec. WCA (°) | CAH (°) | Observation |
|---|---|---|---|---|---|---|---|---|
| FT 1 | A/C | 60° | sticks | Poor | 87.65 | 30.24 | 57.41 | delamination |
| FT 2 | A/C | 117° | 20° | Excellent | 107.60 | 88.12 | 19.48 | good adhesion |
| FT 3 | A/C | 57° | sticks | Poor | 91.22 | 31.56 | 59.66 | delamination |
| FT 4 | A/D | 116° | 20° | Excellent | 108.39 | 98.65 | 9.74 | good adhesion |
| FT 5 | A/D | 114° | 20° | Excellent | 114.91 | 94.27 | 20.64 | good adhesion |
| FT 6 | A/D | 111° | 20° | Excellent | 116.61 | 97.10 | 19.51 | good adhesion |
| FT 7 | B/C | 51° | sticks | Poor | 85.43 | 29.54 | 55.89 | delamination |
| FT 8 | B/C | 50° | sticks | Poor | 89.71 | 25.43 | 64.28 | delamination |
| FT 9 | B/C | 105° | 20° | Poor/OK | 88.76 | 26.50 | 62.26 | partial delamination |
| FT 10 | B/D | 78° | sticks | Poor | 72.59 | 11.68 | 60.91 | partial delamination |
| FT 11 | B/D | 115° | sticks | Poor | 90.23 | 15.76 | 74.47 | partial delamination |
| FT 12 | B/D | 77° | sticks | Poor | 89.34 | 19.34 | 70.00 | delamination |

Effect of cleaning and drying on wet adhesion.

The thin (1% w/o AF1600, <200 nm) amorphous PTFE/PDD copolymer coating, when dried at 170° C. for 20 minutes, demonstrated sufficient ultralyophobic retention in ex-situ tests to warrant short-term performance evaluation in an operating fuel cell. The objective was to determine whether ultralyophobic tunnel regions would have a positive impact on QFS by reducing liquid water holdup in the anode-outlet area of the plate. The anode-outlet corner of the plate was dipped in an alkaline solution (Simple Green®—5 parts water/1 part SG) and then rinsed in de-ionized water to clean the Au surface. After drying, the same corner of the plate was dipped in a 1% w/o PTFE/PDD copolymer (AF1600) solusame fuel-cell and neutron radiography operating procedures but different plate scenarios. All of the plates, despite different designs and/or whether they were treated or not treated with the PTFE/PDD coating, accumulated water in the port manifold/feed region of the plate (active area side of gasket). However, the shape of the pooled water was different for the treated plate. Isolated water droplets were observed on the treated surface compared to web-like slugs of water on the untreated surfaces, suggesting that water was repelled against the lyophobic surface. Although not wishing to be bound by theory, it is postulated that these isolated water droplets were pinned against the mildly hydrophilic surface of the PEN subgasket. Also, and more importantly, the lyophobic treated plate is the only plate that does not accumulate a film of liquid water along the edge of the manifold/tunnel exit. This result is important because liquid water that is purged into the manifold during fuel cell operation would not wick back into the tunnels during stack shutdown, leading to QFS issues.

It is noted that terms like "generally", "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An electrode plate comprising:
   a plate having an active region, a feed region in fluid communication with the active region, and a tunnel region in fluid communication with the feed region and a manifold region, wherein one or more of at least a portion of the tunnel region, at least a portion of the feed region, and an interface between the tunnel region and the manifold region comprises an ultralyophobicity-retaining ultralyophobic surface formed by adhering an ultralyophobic coating under conditions resulting in adherence of a solvent-free ultralyophobic coating, the ultralyophobic surface having a static water contact angle of about 90° to about 120° and a contact angle hysteresis of less than about 20°, wherein the ultralyophobic coating comprises a copolymer of perfluoro(2,2-dimethyl-1,3-dioxole) and tetrafluoroethylene and wherein the conditions resulting in adherence of a solvent-free ultralyophobic coating comprise drying the coating at a temperature greater than both a solvent boiling point and a glass transition temperature (Tg) of a polymer component of the ultralyophobic coating, cleaning by quiescent soaking in alkaline solution, and a drying temperature of at least 170° C.

2. The electrode plate of claim 1 wherein the plate is made of stainless steel.

3. The electrode plate of claim 1 wherein the plate further includes a coating of gold or carbon on at least a portion of the plate.

4. The electrode plate of claim 1 wherein the ultralyophobic surface has a contact angle hysteresis less than about 10°.

5. The electrode plate of claim 1 wherein the ultralyophobic coating has a thickness of less than about 1 micron.

6. A fuel cell assembly comprising:
   a plurality of membrane electrode assemblies, each comprising an anode configured to accept a hydrogen-bearing reactant, and a cathode configured to accept an oxygen-bearing reactant, the anode and cathode separated by a proton-permeable electrolyte membrane; and
   a plurality of electrode plates each of which is disposed between a pair of the plurality of membrane electrode assemblies, each plate defining a reactant channel in fluid communication with a corresponding one of the anode or the cathode of an adjacently facing one of the membrane electrode assemblies, each plate having an active region, a feed region in fluid communication with the active region, and a tunnel region in fluid communication with the feed region and a manifold region on at least one side, wherein one or more of at least a portion of the tunnel region, at least a portion of the feed region, and an interface between the tunnel region and the manifold region of at least one side of each plate comprises an ultralyophobic-retaining ultralyophobic surface formed by adhering an ultralyophobic coating under conditions resulting in adherence of a solvent-free ultralyophobic coating, the ultralyophobic surface having a static water contact angle of about 90° to about 120° and a contact angle hysteresis of less than about 20°, wherein the ultralyophobic coating comprises a copolymer of perfluoro(2,2-dimethyl-1,3-dioxole) and tetrafluoroethylene and wherein the conditions resulting in adherence of a solvent-free ultralyophobic coating comprise drying the coating at a temperature greater than both a solvent boiling point and a glass transition temperature (Tg) of a polymer component of the ultralyophobic coating, cleaning by quiescent soaking in alkaline solution, and a drying temperature of at least 170° C.

7. The fuel cell assembly of claim 6 wherein said plate further includes a coating of gold or carbon on at least a portion of the electrode plate.

8. The fuel cell assembly of claim 6 wherein the ultralyophobic surface has a water contact angle in a range of about 90° to about 120° and a contact angle hysteresis less than about 10°.

9. The fuel cell assembly of claim 6 wherein the ultralyophobic coating has a thickness of less than about 1 micron.

10. The fuel cell assembly of claim 6 wherein said plate is made of stainless steel.

* * * * *